United States Patent
Owens et al.

(10) Patent No.: US 8,334,679 B2
(45) Date of Patent: Dec. 18, 2012

(54) ACG OUTPUT VOLTAGE CONTROL

(75) Inventors: Richard Owens, Powell, OH (US); Tadashi Fujiwara, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 946 days.

(21) Appl. No.: 12/017,882

(22) Filed: Jan. 22, 2008

(65) Prior Publication Data

US 2009/0184693 A1  Jul. 23, 2009

(51) Int. Cl.
*H02P 9/00* (2006.01)
*H02P 1/00* (2006.01)

(52) U.S. Cl. ............... 322/44; 318/139; 180/65.225

(58) Field of Classification Search ............... 322/44; 180/65.225; 318/139
See application file for complete search history.

(56) References Cited

U.S. PATENT DOCUMENTS

| | | | |
|---|---|---|---|
| 1,434,728 A | 11/1922 | Arendt et al. | 320/123 |
| 3,820,009 A | 6/1974 | Itoh et al. | 322/28 |
| 3,876,931 A | 4/1975 | Godshalk | 324/429 |
| 4,137,557 A | 1/1979 | Ciarniello et al. | 361/92 |
| 4,390,828 A | 6/1983 | Converse et al. | 320/153 |
| 4,396,880 A | 8/1983 | Windebank | 320/156 |
| 4,424,477 A | 1/1984 | Enoshima et al. | 322/29 |
| 4,527,112 A | 7/1985 | Herman | 322/38 |
| 4,766,862 A | 8/1988 | Hibino et al. | 123/339.18 |
| 4,848,700 A | 7/1989 | Lockheed | 244/45 A |
| 4,852,540 A | 8/1989 | Safranek | 123/599 |
| 4,902,956 A | 2/1990 | Sloan | 320/135 |
| 5,087,869 A | 2/1992 | Kuriyama et al. | 322/15 |
| 5,204,992 A | 4/1993 | Carpenter | 307/10.7 |
| 5,214,385 A | 5/1993 | Gabriel et al. | 324/434 |
| 5,235,946 A | 8/1993 | Fodale et al. | 477/109 |
| 5,272,380 A | 12/1993 | Clokie | 307/10.7 |
| 5,280,232 A | 1/1994 | Kohl et al. | 322/23 |
| 5,293,076 A | 3/1994 | Fukui | 290/40 C |
| 5,295,078 A | 3/1994 | Stich et al. | 700/297 |
| 5,298,797 A | 3/1994 | Redl | 327/387 |
| 5,300,874 A | 4/1994 | Shimamoto et al. | 320/106 |
| 5,332,958 A | 7/1994 | Sloan | 320/136 |
| 5,343,137 A | 8/1994 | Kitaoka et al. | 320/132 |
| 5,385,126 A | 1/1995 | Matthews | 123/179.21 |
| 5,444,378 A | 8/1995 | Rogers | 324/428 |
| 5,450,321 A | 9/1995 | Crane | 701/35 |

(Continued)

FOREIGN PATENT DOCUMENTS

JP  2006101587 A  *  4/2006

(Continued)

OTHER PUBLICATIONS

Office Action of U.S. Appl. No. 12/388,196 dated May 23, 2011.

(Continued)

*Primary Examiner* — Pedro J Cuevas
(74) *Attorney, Agent, or Firm* — Mark E. Duell; Rankin Hill & Clark LLP

(57) ABSTRACT

A generator control system is provided in a vehicle having an engine that drives an electric power generator arranged to selectively provide electric power to an electrical load of the vehicle and to selectively charge a battery of the vehicle. The generator control system includes: a sensor that detects a state of charge (SOC) of the battery; and, a controller that controls a voltage output mode of the generator in response to the SOC detected by the sensor.

12 Claims, 2 Drawing Sheets

U.S. PATENT DOCUMENTS

| | | | | |
|---|---|---|---|---|
| 5,602,462 | A | 2/1997 | Stich et al. | 323/258 |
| 5,621,298 | A | 4/1997 | Harvey | 320/134 |
| 5,668,465 | A | 9/1997 | May | 361/86 |
| 5,684,370 | A | 11/1997 | Watanabe | 318/151 |
| 5,691,619 | A | 11/1997 | Vingsbo | 361/86 |
| 5,693,986 | A | 12/1997 | Vettraino, Jr. et al. | 307/10.7 |
| 5,699,050 | A | 12/1997 | Kanazawa | 340/636.13 |
| 5,717,937 | A | 2/1998 | Fritz | 713/300 |
| 5,731,690 | A * | 3/1998 | Taniquchi et al. | 322/28 |
| 5,764,469 | A | 6/1998 | Slepian et al. | 361/92 |
| 5,793,359 | A | 8/1998 | Ushikubo | 345/169 |
| 5,798,577 | A | 8/1998 | Lesesky et al. | 307/10.7 |
| 5,823,280 | A * | 10/1998 | Lateur et al. | 180/65.235 |
| 5,831,411 | A | 11/1998 | Klauer et al. | 90/40 R |
| 5,872,443 | A | 2/1999 | Williamson | 320/160 |
| 5,896,023 | A | 4/1999 | Richter | 320/104 |
| 5,969,624 | A * | 10/1999 | Sakai et al. | 340/636.1 |
| 6,066,899 | A | 5/2000 | Rund et al. | 307/10.7 |
| 6,081,098 | A | 6/2000 | Bertness et al. | 320/134 |
| 6,114,775 | A * | 9/2000 | Chung et al. | 307/10.1 |
| 6,118,237 | A * | 9/2000 | Kikuchi et al. | 318/139 |
| 6,137,250 | A * | 10/2000 | Hirano et al. | 318/376 |
| 6,313,608 | B1 | 11/2001 | Varghese et al. | 320/132 |
| 6,314,346 | B1 * | 11/2001 | Kitajima et al. | 701/22 |
| 6,316,914 | B1 | 11/2001 | Bertness | 320/134 |
| 6,318,487 | B2 * | 11/2001 | Yanase et al. | 180/65.245 |
| 6,331,762 | B1 | 12/2001 | Bertness | 320/134 |
| 6,401,012 | B1 * | 6/2002 | Aoki et al. | 701/1 |
| 6,429,613 | B2 * | 8/2002 | Yanase et al. | 318/139 |
| 6,476,571 | B1 * | 11/2002 | Sasaki | 318/139 |
| 6,515,456 | B1 | 2/2003 | Mixon | 320/160 |
| 6,563,230 | B2 * | 5/2003 | Nada | 290/40 C |
| 6,643,223 | B2 | 11/2003 | Fujisawa | 368/204 |
| 6,700,386 | B2 * | 3/2004 | Egami | 324/503 |
| 6,752,226 | B2 * | 6/2004 | Naito et al. | 180/65.26 |
| 6,759,760 | B2 | 7/2004 | Gaynier et al. | 307/10.7 |
| 6,766,874 | B2 * | 7/2004 | Naito et al. | 180/65.26 |
| 6,784,563 | B2 * | 8/2004 | Nada | 290/40 C |
| 6,793,059 | B2 * | 9/2004 | Okada et al. | 192/84.1 |
| 6,794,765 | B2 * | 9/2004 | Izumiura et al. | 290/38 R |
| 6,806,588 | B2 | 10/2004 | Amano et al. | 307/10.7 |
| 6,836,718 | B2 | 12/2004 | Hasfjord et al. | 701/54 |
| 6,871,151 | B2 | 3/2005 | Bertness | 702/63 |
| 6,962,224 | B2 * | 11/2005 | Nakanowatari | 180/65.225 |
| 7,003,411 | B2 | 2/2006 | Bertness | 702/63 |
| 7,028,796 | B2 * | 4/2006 | Kim | 180/65.225 |
| 7,116,078 | B2 | 10/2006 | Colombo et al. | 320/104 |
| 7,126,341 | B2 | 10/2006 | Bertness et al. | 324/426 |
| 7,146,959 | B2 | 12/2006 | Thompson et al. | 123/179.4 |
| 7,165,638 | B2 * | 1/2007 | Ito et al. | 180/65.23 |
| 7,173,347 | B2 * | 2/2007 | Tani et al. | 307/10.1 |
| 7,228,841 | B2 * | 6/2007 | Takemoto et al. | 123/304 |
| 7,273,120 | B2 * | 9/2007 | Tabata | 180/65.265 |
| 7,276,806 | B1 * | 10/2007 | Sheidler et al. | 290/40 A |
| 7,315,774 | B2 * | 1/2008 | Morris | 701/53 |
| 7,317,300 | B2 * | 1/2008 | Sada et al. | 320/136 |
| 7,332,881 | B2 * | 2/2008 | Clark et al. | 318/139 |
| 7,416,037 | B2 * | 8/2008 | Huelser et al. | 180/65.28 |
| 7,472,769 | B2 * | 1/2009 | Yamanaka et al. | 180/65.25 |
| 7,514,807 | B2 | 4/2009 | Donnelly et al. | 290/40 C |
| 7,560,882 | B2 * | 7/2009 | Clark et al. | 318/139 |
| 7,825,616 | B2 * | 11/2010 | Clark et al. | 318/139 |
| 8,217,631 | B2 * | 7/2012 | Owens et al. | 322/44 |
| 2003/0173123 | A1 * | 9/2003 | Nakanowatari | 180/65.2 |
| 2003/0173124 | A1 * | 9/2003 | Okada et al. | 180/65.2 |
| 2003/0236599 | A1 | 12/2003 | Saito et al. | 701/22 |
| 2004/0189254 | A1 | 9/2004 | Kapsokavathis et al. | 320/132 |
| 2004/0263176 | A1 | 12/2004 | Vonderhaar et al. | 324/426 |
| 2005/0024061 | A1 | 2/2005 | Cox et al. | 324/426 |
| 2005/0068039 | A1 | 3/2005 | Bertness | 324/426 |
| 2005/0162172 | A1 | 7/2005 | Bertness | 324/426 |
| 2005/0285445 | A1 | 12/2005 | Wruck et al. | 307/10.1 |
| 2006/0214508 | A1 | 9/2006 | Binder | 307/10.7 |
| 2006/0282227 | A1 | 12/2006 | Bertness | 702/63 |
| 2007/0069734 | A1 | 3/2007 | Bertness | 324/411 |
| 2007/0159177 | A1 | 7/2007 | Bertness et al. | 324/426 |
| 2007/0213891 | A1 | 9/2007 | Musser | 701/22 |
| 2008/0204031 | A1 | 8/2008 | Iwane et al. | 324/430 |
| 2009/0184692 | A1 * | 7/2009 | Owens et al. | 322/23 |
| 2009/0184693 | A1 * | 7/2009 | Owens et al. | 322/37 |
| 2010/0123465 | A1 * | 5/2010 | Owens et al. | 324/503 |
| 2012/0133310 | A1 * | 5/2012 | Lee | 318/139 |

FOREIGN PATENT DOCUMENTS

| | | |
|---|---|---|
| WO | WO 96/11817 | 4/1996 |
| WO | WO 2007032382 A1 * | 3/2007 |

OTHER PUBLICATIONS

PCT International Search Report, Mar. 13, 2009, PCT/US2009/031525.

Office Action dated Sep. 28, 2011 from U.S. Appl. No. 12/388,196.

Office Action of U.S. Appl. No. 12/388,196 dated Feb. 23, 2012.

* cited by examiner

ACG OUTPUT VOLTAGE CONTROL

BACKGROUND

The present specification relates generally to the automotive arts. More specifically, the present specification relates to a control system and/or method that adjusts or otherwise regulates the output voltage of a vehicle's electric power generator in response to a detected state of charge (SOC) of the vehicle's battery. Particular application is found in connection with an electrical system of a motor vehicle (e.g., an automobile or other vehicle driven by an internal combustion engine), and the specification makes particular reference thereto. However, it is to be appreciated that aspects of the present subject matter are also amenable to other like applications.

As is known in the art, many automotive vehicles generally include an internal combustion or other like engine that drives the vehicle. A modern vehicle is also typically provisioned with an electrical system including: (i) a battery which provides a source of electric power for starting the vehicle's engine; and, (ii) one or more electric circuits or loads (e.g., headlights, clocks, electrically powered adjustable components such as seats, mirrors or steering columns, interior cabin lights, electric heaters for seats, mirrors, windows or the like, radios and/or other entertainment systems, electronic memories for recording radio station presets and/or user preferred seat and/or mirror positions, electronic navigation systems, etc.) that may also be selectively powered by the vehicle's battery. The trend of providing more electronic features and/or devices in a vehicle typically results in additional burden on the vehicle's battery and thus it becomes even more prudent to pay meaningful consideration to maintaining the health of the battery.

Typically, the vehicle's electrical system also includes an electric generator or other like device that is driven by the engine to produce electric power when the engine is running. For example, such a device is an alternating current generator (ACG), also commonly referred to as an alternator. Generally, the generator or ACG is arranged to selectively provide electric power to the aforementioned loads and/or to charge the battery.

A conventional generator or ACG of the type typically employed in an automotive vehicle is usually free to selectively operate in and/or cycle between one of two voltage output modes, e.g., depending on the operative state of the loads and/or demand for electric power from the generator or ACG. For example, in a first or HI output voltage mode, the output voltage of the generator or ACG is typically about 14.5 volts (V), and in a second or LO output voltage mode, the output voltage of the generator or ACG is typically about 12.5 V. Accordingly, when the electric power demand is relatively high or heavy, the generator or ACG normally operates in the HI output voltage mode, and when the electric power demand is relatively low or light, the generator or ACG normally operates in the LO output voltage mode. In customary automotive applications, the generator or ACG is generally free to selectively cycle between the two modes as the electric power demanded from the generator or ACG varies, e.g., due to changes in the operative states of the various loads.

In any event, while generally acceptable, the foregoing conventional operation of the ACG or generator may still not provide for suitable maintenance of the battery at a desired SOC in all circumstances. For example, continual operation of the ACG or generator in the HI voltage output mode, can result in overcharging of the battery and/or inefficient use of the vehicle's fuel—i.e., wasted fuel. Conversely, continual operation of the ACG or generator in a LO voltage output mode, can result in insufficient electrical power generation to effectively maintain the battery's SOC at or above a desired level.

Accordingly, a new and improved system and/or method is disclosed that overcomes the above-referenced problems and others by suitably controlling the output voltage of the ACG or generator.

SUMMARY

According to one aspect, a generator control system is provided in a vehicle having an engine that drives an electric power generator arranged to selectively provide electric power to an electrical load of the vehicle and to selectively charge a battery of the vehicle. The generator control system includes: a sensor that detects a state of charge (SOC) of the battery; and, a controller that controls a voltage output mode of the generator in response to the SOC detected by the sensor.

According to another aspect, a method for controlling a voltage output mode of a generator is provided in a vehicle having an engine that drives an electric power generator arranged to selectively provide electric power to an electrical load of the vehicle and to selectively charge a battery of the vehicle. The method includes: determining a state of charge (SOC) of the battery; and, controlling a voltage output mode of the generator in response to the SOC.

According to still another aspect, a system for controlling a voltage output mode of a generator is provided in a vehicle having an engine that drives an electric power generator arranged to selectively provide electric power to an electrical load of the vehicle and to selectively charge a battery of the vehicle. The system includes: means for determining a state of charge (SOC) of the battery; and, means for controlling a voltage output mode of the generator in response to the SOC.

DETAILED DESCRIPTION

Figure 1:
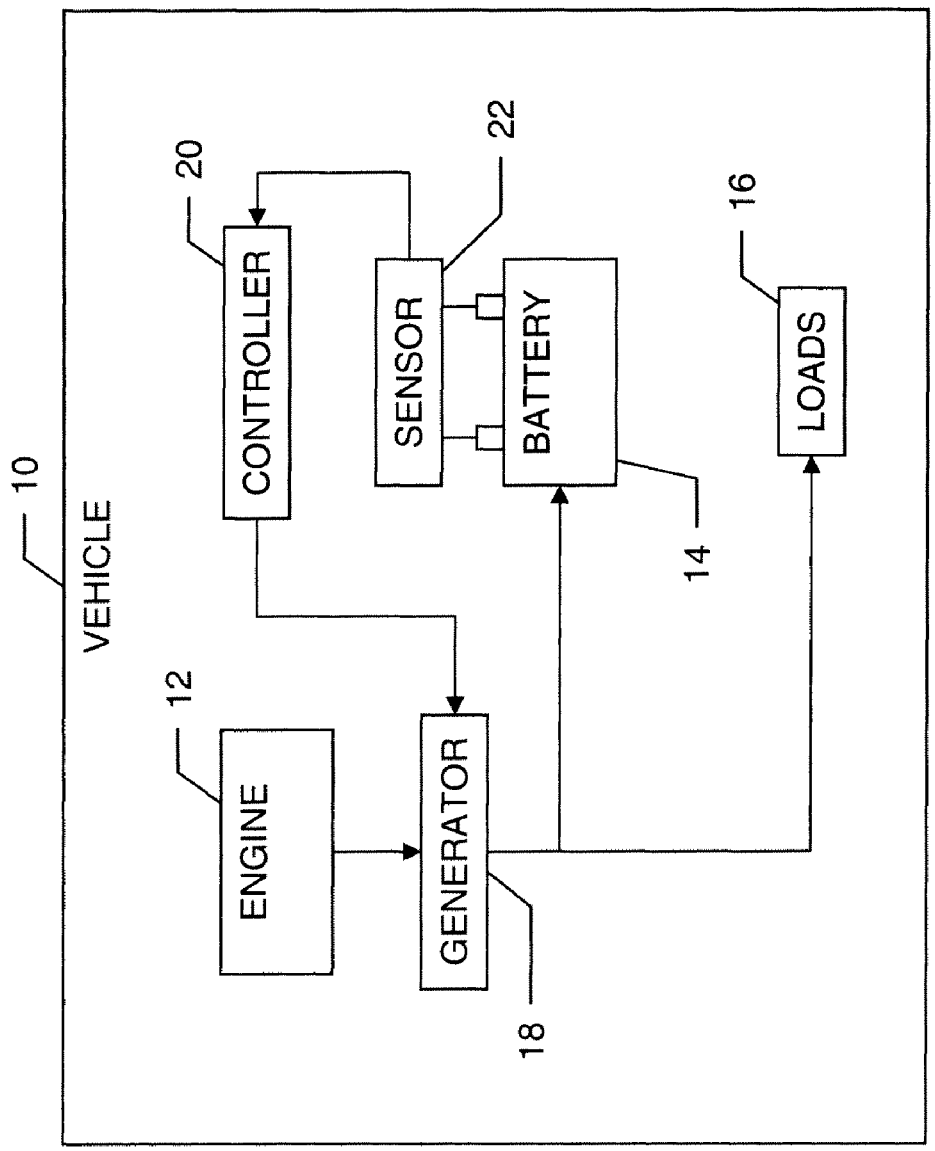
FIG. 1 is a schematic diagram showing an exemplary electric generator output voltage control system of a vehicle suitable for practicing aspects of the present disclosed subject matter.

Referring now to the drawings, wherein the showings are for purposes of illustrating one or more exemplary embodiments, FIG. 1 shows a schematic diagram of an electric generator control system for a vehicle 10, e.g., such an automobile or other similar automotive vehicle. As shown, the vehicle 10 includes an engine 12 (e.g., an internal combustion engine or the like) that drives the vehicle 10. The vehicle 10 is also provisioned with an electrical system including: a battery 14 which suitably provides a source of electrical power for starting the vehicle 10; and, one or more electric circuits or loads that may also be selectively powered by the vehicle's battery 14. As illustrated in FIG. 1, the loads are collectively represented by box 16 and may include, e.g., headlights, clocks, electrically powered adjustable components such as seats, mirrors or steering columns, interior cabin lights, electric heaters for seats, mirrors, windows or the like, radios and/or other entertainment systems, electronic memories for recording radio station presets and/or user preferred seat and/ or mirror positions, electronic navigation systems, etc. Suitably, the battery is a nominal 12 volt (v) battery of the type commonly employed in automobiles or may be any other type of battery, e.g., typically used in automotive applications.

The vehicle 10 also includes an electric generator 18 (e.g., an ACG or alternator or other like device commonly known and/or employed in the automotive arts) that is driven by the engine 12 to produce electric power when the engine 12 is running. In the illustrated embodiment, the ACG 18 is arranged to selectively provide electric power to the loads 16 and/or to charge the battery 14.

Suitably, the generator 18 is the type typically employed in an automotive vehicle and under normal operating conditions (i.e., when the battery SOC is at or near a desired level or within a desired range) the generator 18 is free to selectively operate in and/or cycle between one of two voltage output modes, e.g., depending on the operative state of the loads 16 and/or demand for electric power from the generator 18. For example, in a first or Hi output voltage mode, the output voltage of the generator 18 is typically about 14.5 V, and in a second or LO output voltage mode, the output voltage of the generator 18 is typically about 12.5 V. Optionally, these voltage values may vary, e.g., depending on the internal or other temperature of the generator 18. In a suitable embodiment, under normal operating conditions, when the electric power demand is relatively high or heavy, the generator 18 generally operates in the HI output voltage mode, and when the electric power demand is relatively low or light, the generator 18 generally operates in the LO output voltage mode. That is to say, under normal operating conditions, the generator 18 is generally free to selectively cycle between the two modes as the electric power demanded from the generator 18 varies, e.g., due to changes in the operative states of the loads 16.

Suitably, the generator control system includes a controller 20 that regulates and/or otherwise controls the output voltage of the generator 18 in response to the SOC of the battery 14. As shown, the SOC of the battery 14 is obtained by the controller 20 from a sensor unit or sensor 22 that is electrically and/or otherwise operatively connected to the battery 14 so as to sense and/or otherwise detect the SOC of the battery 14. That is to say, in the illustrated embodiment, the generator control system also suitably includes a SOC sensor 22 that senses, detects and/or otherwise determines a SOC or condition of the battery 14 and communicates this information to the controller 20 which in turn controls the operating mode of the generator 18 based on the received information.

More specifically, for example, the controller 20 receives a signal representative of a condition or SOC of the battery 14 from the sensor 22. In the illustrated embodiment, the sensor 22 is electrically connected to the battery 14 for determining the SOC and/or condition of the battery 14 and generating an SOC signal representative thereof to send to the controller 20. The SOC signal can be one or more signals that indicate the condition or SOC of the battery 14. The condition can be a value indicating the charge remaining in the battery 14 relative to a scale ranging between a low end where no charge remains in the battery 14 and a high end where the battery 14 is fully charged. In one suitable embodiment, the SOC signal indicates the condition of the battery 14 as related to its overall charge capacity (i.e., a value or percentage of a maximum SOC of the battery 14). In another exemplary embodiment, the SOC signal indicates the percentage of maximum electrical energy output of the battery 14.

In either event, suitably the sensor 22 measures or otherwise detects any one or more of a variety of different factors and/or parameters from which the battery's SOC is calculated or otherwise determined. These factors or parameters suitably include but are not limited to, the battery voltage, battery current, charge balance, battery temperature, etc. In practice, any of a variety of well know or otherwise appropriate methods and/or algorithms may optionally be used to calculate or determine the SOC from the respective parameters measured or otherwise obtained by the sensor 22.

Generally, based on the SOC or condition of the battery 14 or more specifically the SOC signal received from the sensor 22, the controller 20 regulates or otherwise controls the operation of the generator 18. In particular, if the SOC is outside a set or otherwise determined range, then controller 20 sends or otherwise provides a control signal or the like to the generator 18 to thereby force, induce or otherwise compel the generator 18 to operate in a particular one of the two operating modes, i.e., HI or LO. Alternately, if the SOC is within the set or determined range, then the controller 20 allows the generator 18 to operate normally, i.e., to freely switch or cycle between the HI and LO operating modes selectively in accordance with otherwise normal operating conditions.

For example, if the SOC is at or above a first threshold (TH1) (e.g., approximately 98%), then the controller 20 outputs a control signal to the generator 18 which forces or instructs or otherwise controls the generator 18 so that the generator 18 operates in the LO voltage output mode. Alternately, if the SOC is at or below a second threshold (TH2) (e.g., approximately 80%), then the controller 20 outputs a control signal to the generator 18 which forces or instructs or otherwise controls the generator 18 so that the generator 18 operates in the HI voltage output mode. Otherwise, if the SOC is in-between the first and second thresholds, then in one embodiment the controller 20 outputs no control signal to the generator 18 thereby allowing the generator 18 to operate in its normal manner, i.e., freely switching or cycling between the HI and LO voltage output modes. In another embodiment, if the SOC is in-between the first and second thresholds, then the controller 20 may still output a control signal to the generator 18 which in this instance instructs or otherwise allows the generator 18 to operate in its normal manner, again, freely switching or cycling between the HI and LO voltage output modes.

While the values of 98% and 80% have been referred to herein with regard to the thresholds TH1 and TH2, respectively, it is to be appreciated that these values are merely examples. In practice, other suitable threshold values for TH1 and/or TH2 may be used, e.g., depending on the particular application, the specific battery type and/or as otherwise desired. For example, TH1 may optionally be in the approximate range of 98% to 102% for a VRLA (valve-regulated lead acid) or AGM (absorbent glass mat) type battery. Alternately, in the case of a flooded lead acid type battery, TH1 may optionally be in the approximate range of 100% to 110%. Suitably, the actual threshold values may depend, e.g., on the vehicle and/or electrical system parameters associated with a particular application.

Figure 2:
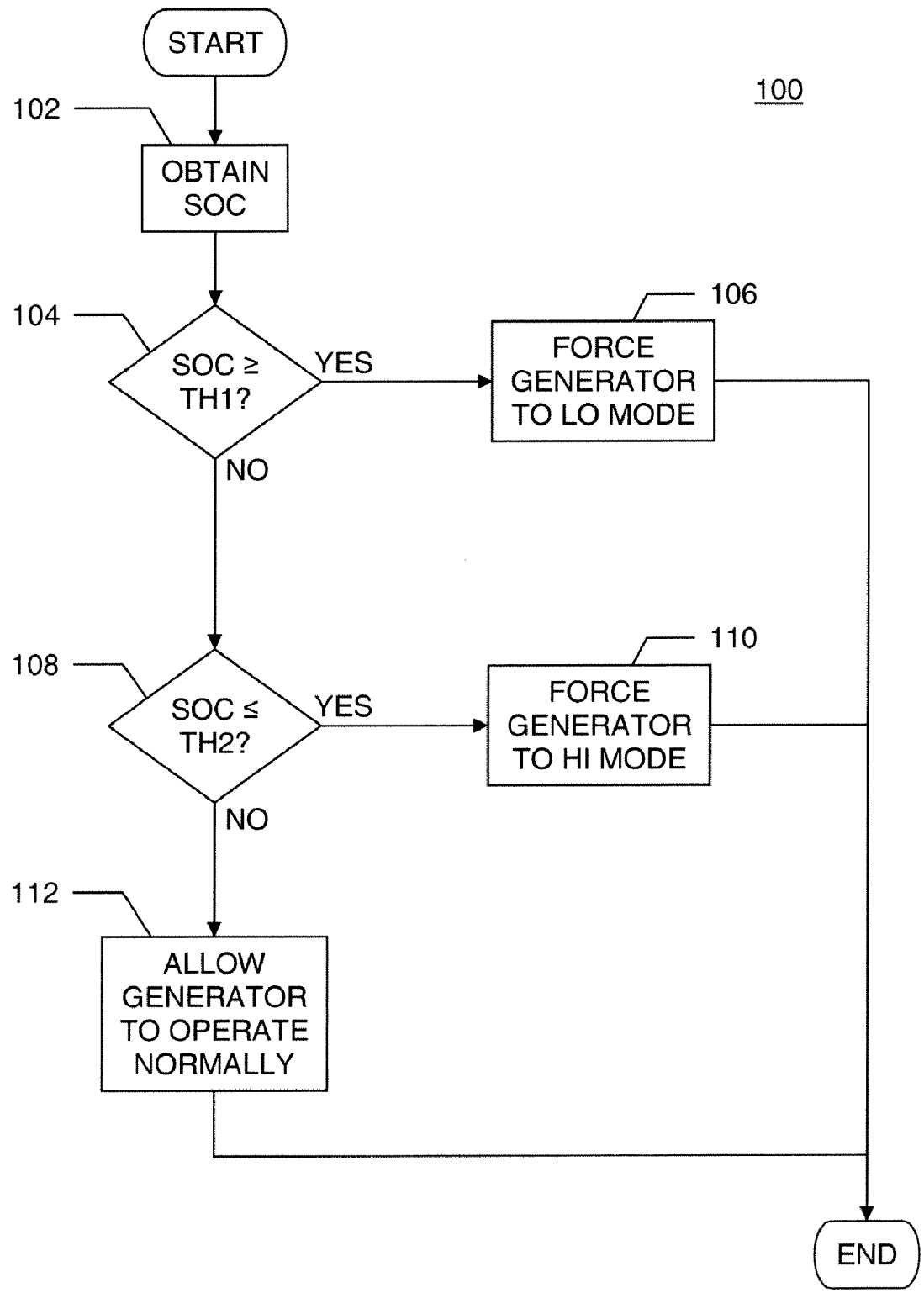
FIG. 2 is a flow chart showing an exemplary process for controlling an electric generator's output voltage in accordance with aspects of the present disclosed subject matter.

With reference now to FIG. 2, there is shown an exemplary process 100 executed by the controller 20 for selectively controlling the voltage output mode of the generator 18 based upon the SOC or condition of the battery 14 sensed or detected by the sensor 22.

In the illustrated example, at step 102, the controller 20 obtains the SOC of the battery 14 from the sensor 22. In turn, at decision step 104, the controller 20 compares the SOC obtained in step 102 to the first threshold TH1. If the SOC is at or above the first threshold (i.e., if SOC≧TH1), then the process 100 branches to step 106, otherwise if the SOC is below the first threshold (i.e., if SOC<TH1), then the process 100 continues to step 108.

At step 106, the controller 20 outputs a control signal or the like to the generator 18 which compels or instructs the generator 18 to operate in the LO voltage output mode and the process 100 then ends.

At decision step 108, the controller 20 compares the SOC obtained in step 102 to the second threshold TH2. If the SOC is at or below the second threshold (i.e., if SOC≦TH2), then the process 100 branches to step 110, otherwise if the SOC is above the second threshold (i.e., if SOC>TH2), then the process 100 continues to step 112.

At step 110, the controller 20 outputs a control signal or the like to the generator 18 which compels or instructs the generator 18 to operate in the HI voltage output mode and the process 100 then ends.

In one suitable embodiment, at step 112, the controller 20 outputs no control signal to the generator 18 thereby allowing the generator 18 to operate in its normal manner, i.e., freely switching or cycling between the Hi and LO voltage output modes. Alternately, in another suitable embodiment, at step 112, the controller 20 outputs a control signal or the like to the generator 18 instructing the generator 18 to operate in its normal manner, again, freely switching or cycling between the HI and LO voltage output modes. In either case, as shown in the illustrated embodiment, following step 112, the process 100 ends.

Of course, in one exemplary embodiment, the controller 20 optionally repeats the process 100 from time-to-time in order to periodically or intermittently control the operating mode of the generator 18 over time, e.g., as the SOC of the battery 14 may vary from time-to-time. For example, in one suitable embodiment, the process 100 is run by the controller 20 each time a new or updated SOC signal is received or obtained from the sensor 22.

While one or more of the various embodiments have been described herein with reference to the battery's SOC, it is to be appreciated that SOC is merely an exemplary parameter that is sensed, measured and/or otherwise determined and accordingly used in one or more suitable manners as explained above. More generally and/or in alternate embodiments, other parameters indicative of and/or related to the battery's state of function (SOF) may similarly be obtained (i.e., sensed, measured and/or otherwise determined) and suitably used in place of the SOC. In this regard, examples of the battery's SOF include not only the battery's SOC but also the battery's cranking voltage, the internal resistance of the battery, the battery's reserve capacity, the cold cranking amperes (CCA) of the battery, the battery's health and the like. Accordingly, it is intended that the terms and/or parameters SOC and SOF when used herein may optionally be interchanged where appropriate to achieve various alternate embodiments suitable for particular desired applications.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in common elements and/or components where appropriate. For example, the sensor 22 and controller 20 may suitably be integrated together. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. For example, the controller 20 and/or sensor 22 may be implemented as appropriate hardware circuits or alternately as microprocessors programmed to implement their respective functions. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, it will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. In a vehicle having an engine that drives an electric power generator arranged to provide electric power to an electrical load of the vehicle and to charge a battery of the vehicle, a generator control system comprising:
   a sensor that detects a state of charge (SOC) of the battery; and
   a controller provides a control signal to the generator based upon the SOC detected by the sensor, wherein said control signal instructs the generator to operate in a LO voltage output mode when the SOC is detected to be above a first determined threshold, wherein the control signal instructs the generator to operate in the HI voltage output mode when the SOC is detected to be below a second determined threshold, the second determined threshold being less than the first determined threshold, said generator otherwise being free to selectively switch between the HI voltage output mode and the LO voltage output mode in response to varying electric power demands when the SOC is detected to be between the first determined threshold and the second determined threshold.

2. The generator control system of claim 1 wherein the first determined threshold is in a value selected within a range of 98% to 110% of a maximum SOC of the battery.

3. The generator control system of claim 2 wherein the second determined threshold is a value selected within a range of 20% to 80% of a maximum SOC of the battery.

4. The generator control system of claim 2 wherein an output voltage of the generator when operating in the HI voltage output mode is approximately 14.5 volts.

5. The generator control system of claim 2 wherein the output voltage of the generator when operating in the LO voltage output mode is approximately 12.5 volts.

6. The generator control system of claim 2 wherein the generator is an alternator.

7. In a vehicle having an engine that drives an electric power generator arranged to provide electric power to an electrical load of the vehicle and to charge a battery of the vehicle, a method for controlling a voltage output mode of the generator comprising:
   (a) detecting a state of charge (SOC) of the battery; and (b) controlling the voltage output mode of the generator in response to the detected SOC, wherein the generator is controlled to operate in a LO voltage output mode when the SOC is detected to be above a first determined threshold, wherein the generator is controlled to operate in a HI voltage output mode when the SOC is detected to be below a second determined threshold, the second determined threshold is less than the first determined threshold, and wherein the generator is otherwise free to selectively switch between the HI voltage output mode and the LO voltage output mode in response to varying electric power demands when the SOC is detected to be between the first determined threshold and the second determined threshold.

8. The method of claim 7 wherein an output voltage of the generator when operating in the LO voltage output mode is approximately 12.5 volts.

9. The method of claim 7 wherein the output voltage of the generator when operating in the HI voltage output mode is approximately 14.5 volts.

10. In a vehicle having an engine that drives an electric power generator arranged to provide electric power to an electrical load of the vehicle and to charge a battery of the vehicle, a system for controlling a voltage output mode of the generator comprising:

means for determining a state of charge (SOC) of the battery; and means for controlling the voltage output mode of the generator based upon the SOC, said means for controlling the voltage output mode of the generator compelling the generator to operate in a LO voltage output mode when the SOC is above a first determined threshold, said means for controlling the voltage output mode of the generator compelling the generator to operate in a HI voltage output mode when the SOC is below a second determined threshold, the second determined threshold being less than the first determined threshold, wherein said generator is otherwise free to selectively switch between the HI voltage output mode and the LO voltage output mode in response to varying electric power demands when the SOC is between the first determined threshold and the second determined threshold.

11. The system of claim 10 wherein the second determined threshold is a value selected within the range of 20% to 80% of a maximum SOC of the battery.

12. The system of claim 10 wherein the first determined threshold is a value selected within a range of 98% to 110% of a maximum SOC of the battery.

* * * * *